(12) United States Patent
Couto et al.

(10) Patent No.: US 11,722,477 B2
(45) Date of Patent: Aug. 8, 2023

(54) AUTOMATED RENEWAL OF CERTIFICATES ACROSS A DISTRIBUTED COMPUTING SECURITY SYSTEM

(71) Applicant: Forcepoint LLC, Austin, TX (US)

(72) Inventors: Luis Diogo Monteiro Duarte Couto, Cork (IE); Ciarán James Dorney, Cork (IE); Ralph Hans Depping, Cork (IE); Jordan Smith, Cork (IE); Finbar O'Mahony, Cork (IE)

(73) Assignee: FORCEPOINT LLC, Austin, TX (US)

( * ) Notice: Subject to any disclaimer, the term of this patent is extended or adjusted under 35 U.S.C. 154(b) by 191 days.

(21) Appl. No.: 16/747,792

(22) Filed: Jan. 21, 2020

(65) Prior Publication Data

US 2021/0226940 A1    Jul. 22, 2021

(51) Int. Cl.
*H04L 29/06* (2006.01)
*H04L 9/40* (2022.01)
*H04L 9/32* (2006.01)

(52) U.S. Cl.
CPC ........ *H04L 63/0823* (2013.01); *H04L 9/3263* (2013.01); *H04L 63/0281* (2013.01); *H04L 63/108* (2013.01)

(58) Field of Classification Search
CPC ............. H04L 63/0823; H04L 63/0281; H04L 63/108; H04L 9/3263
See application file for complete search history.

(56) References Cited

U.S. PATENT DOCUMENTS

| | | | |
|---|---|---|---|
| 7,290,133 B1 * | 10/2007 | Montgomery | H04L 9/3263 713/175 |
| 8,200,775 B2 | 6/2012 | Moore | |
| 8,205,240 B2 | 6/2012 | Ansari et al. | |
| 8,468,244 B2 | 6/2013 | Redlich et al. | |
| 8,635,446 B2 | 1/2014 | Pelton et al. | |
| 8,683,605 B1 * | 3/2014 | Tenenboym | G06F 21/64 713/156 |
| 9,432,356 B1 * | 8/2016 | Johansson | H04L 9/3268 |
| 10,530,814 B2 | 1/2020 | Ylonen | |
| 2005/0080899 A1 * | 4/2005 | Vogel | H04L 9/3236 709/225 |
| 2006/0069913 A1 * | 3/2006 | Valente | H04L 9/3265 713/166 |

(Continued)

FOREIGN PATENT DOCUMENTS

| | | |
|---|---|---|
| CN | 107637018 A | 1/2018 |
| EP | 1229443 | 7/2009 |
| JP | 2011227929 A | 11/2011 |

OTHER PUBLICATIONS

Jozef Filipek et al., Distributed Firewall Using PKI in Mobile Ad Hoc Networks, Jun. 25, 2015, ACM, pp. 292-298. (Year: 2015).*

(Continued)

*Primary Examiner* — Luu T Pham
*Assistant Examiner* — Fahimeh Mohammadi
(74) *Attorney, Agent, or Firm* — Jackson Walker LLP; Christopher J. Rourk

(57) ABSTRACT

A system for data processing, comprising a plurality of data processing systems, each associated with a user and having an anchor certificate, a proxy system operating on a processor and configured to determine whether an expiration associated with the anchor certificate for each data processing system is within a predetermined time of expiration and a certificate expiration monitor operating on the processor and configured to generate a certificate signing request in response to the determination that the expiration associated with the anchor certificate for each data processing system is within the predetermined time of expiration.

14 Claims, 2 Drawing Sheets

(56) References Cited

U.S. PATENT DOCUMENTS

| | | |
|---|---|---|
| 2010/0250922 A1* | 9/2010 | Bao ................... H04L 63/0823 |
| | | 713/158 |
| 2012/0266209 A1 | 10/2012 | Gooding et al. |
| 2014/0068251 A1* | 3/2014 | Ignaci ................... H04L 9/006 |
| | | 713/158 |
| 2014/0351586 A1* | 11/2014 | Hook ................. G06F 21/6218 |
| | | 713/164 |
| 2015/0113264 A1* | 4/2015 | Wang ................. H04L 63/0464 |
| | | 713/151 |
| 2016/0173488 A1* | 6/2016 | Xie ...................... H04L 9/3263 |
| | | 713/156 |
| 2016/0315777 A1* | 10/2016 | Lloyd ................. H04L 63/0823 |
| 2017/0250827 A1* | 8/2017 | Opschroef ............ H04L 9/0891 |
| 2018/0262347 A1* | 9/2018 | Levy ...................... H04L 9/006 |
| 2020/0059372 A1* | 2/2020 | Goeringer ............ H04L 9/3265 |
| 2020/0136838 A1* | 4/2020 | Kucharski ............ H04L 9/3265 |
| 2020/0154272 A1* | 5/2020 | Uy ........................ H04W 12/04 |

OTHER PUBLICATIONS

Josh Aas et al., Let's Encrypt: An Automated Certificate Authority to Encrypt the Entire Web, Nov. 6, 2019, ACM, pp. 2473-2487. (Year: 2019).*

Diego Kreutz et al., Towards Secure and Dependable Software-Defined Networks, Aug. 16, 2013, ACM, pp. 55-60. (Year: 2013).*

Stephen Papa et al., Placement of Trust Anchors in Embedded Computer Systems, Jul. 14, 2011, IEEE, pp. 111-116. (Year: 2011).*

* cited by examiner

AUTOMATED RENEWAL OF CERTIFICATES ACROSS A DISTRIBUTED COMPUTING SECURITY SYSTEM

TECHNICAL FIELD

The present disclosure relates generally to network communications, and more specifically to the automated renewal of certificates across distributed computing systems performing security functions.

BACKGROUND OF THE INVENTION

Certificates can be used to increase the security of communications over a network, but they can be compromised, detected and used by a malicious third party. As a result, certificates are often manually replaced, which is time consuming and prone to complications.

SUMMARY OF THE INVENTION

A system for data processing is provided that includes a plurality of data processing systems, such as user computers, each associated with a user and having an anchor certificate, and other security systems, each with their own certificate. One such system is a proxy system operating on a processor and it is configured to determine whether an expiration associated with a certificate is within a predetermined time of expiration, so as to take action prior to expiration and to ensure continuity of use. A certificate expiration monitor operating on the processor is configured to generate a certificate signing request in response to the determination that the expiration associated with the certificate for the proxy system is within the predetermined time of expiration.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
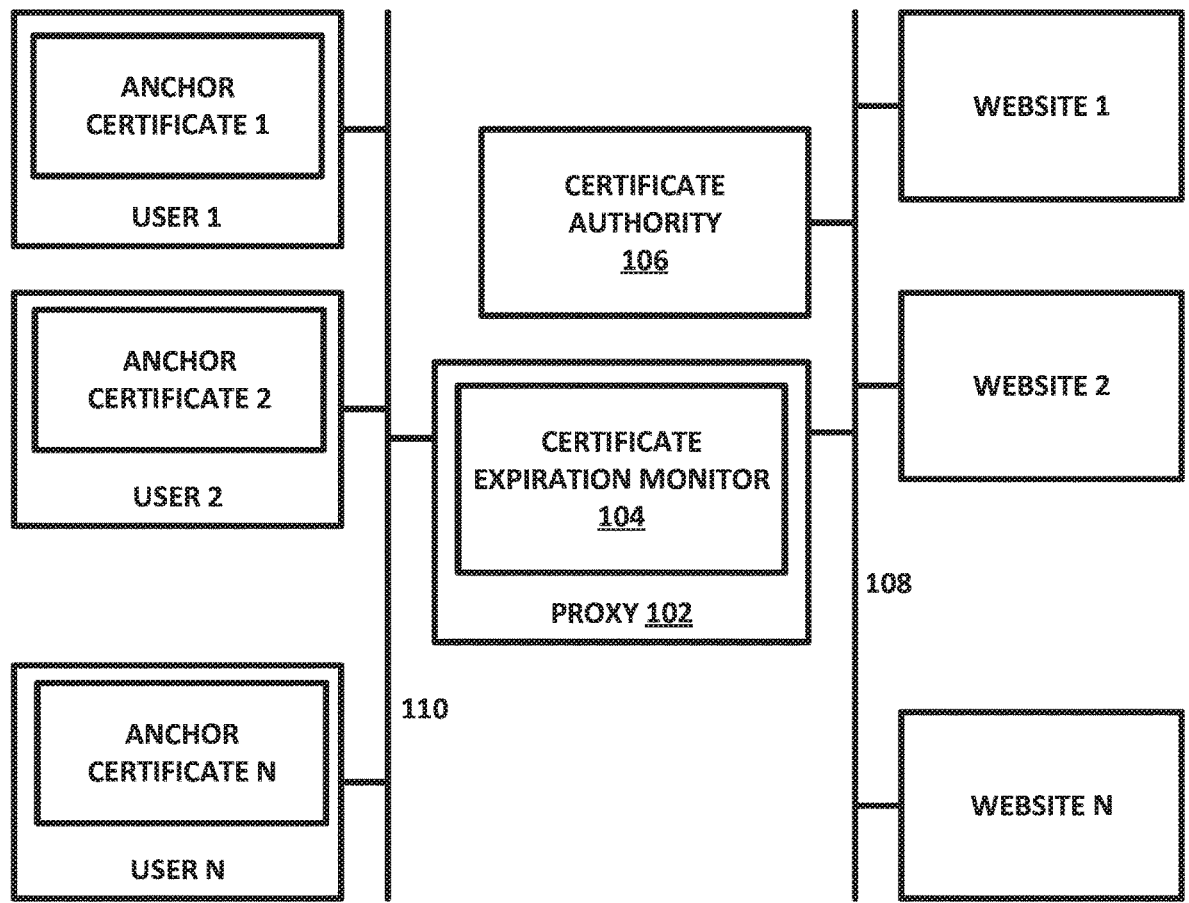
FIG. 1 is a diagram of a system for automated renewal of certificates across a distributed computing system, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

A firewall is a computer network system that is used to process inbound and outbound network data traffic to evaluate whether the data traffic creates or could potentially create a threat to network security. In order for the firewall to perform data traffic inspection, the firewall system can use a certification process, whereby a certificate is used for data traffic to ensure that it is secure. In particular, the data traffic can be encrypted and the certificate can be used to decrypt the encrypted data. Any attempt to bypass the firewall can then be easily detected, because it will lack the certificate or be unable to decrypt the protected data communications.

To ensure secure, continued operation on the system, a certificate is renewed, which means that it is replaced with a new value to prevent an adverse party from either interfering with data traffic or defeating the network security provided by the firewall system. The process of certificate renewal should be automated and secure to provide improved protection over certificate renewal processes that lack these features.

The present disclosure is directed to a public key infrastructure (PKI) that can automatically sign certificates via a certificate signing request (CSR). A mechanism is provided in the firewall agent to detect a certificate that is close to expiry, and to automatically generate and send the CSR. An additional service is disclosed that provides a point of contact for agents to send their CSRs to, thus providing further protection for security-critical PKI. The PKI itself can either be a single system or be geographically distributed with multiple levels of hierarchy, with multiple child and sub-child instances that are also in auto-renewal. In one example embodiment, a master PKI can be used to automatically sign certificates for the child instances and the certificate for the master PKI can be signed automatically or manually, to provide additional security.

Manual signing of CSRs from a firewall system has been used with longer lived certificates, to facilitate the processes of manual signing. In these configurations, the firewall system is provisioned with a long-lived manual certificate that is delivered directly to the user. An updated certificate is then provided as part of a new firewall release to the user. However, such manual signing with longer renewal can result in decreased security.

FIG. 1 is a diagram of a system 100 for automated renewal of certificates across distributed computing system, in accordance with an example embodiment of the present disclosure. System 100 includes proxy 102, certificate expiration monitor 104, certificate authority 106, network 108, network 110, user 1 and anchor certificate 1 through user N and anchor certificate N, and websites 1 though N, each of which can be implemented in hardware or a suitable combination of hardware and software.

Proxy 102 can be implemented using one or more algorithms that are configured to be loaded onto a processor and to control the processor to interface with certificate authority 106, user 1 and anchor certificate 1 through user N and anchor certificate N, and websites 1 though N over networks 108 and network 110. In one example embodiment, proxy 102 can perform a firewall function and can provide user 1 through user N with secure access to websites 1 through N. Proxy 102 has a certificate to allow it to function as an intermediary, as part of its security function. In this example embodiment, proxy 102 can use certificate expiration monitor 104 to determine whether the certificate of proxy 102 is nearing expiration.

In cases where proxy 102 provides security functions for users, such as the example embodiment where proxy 102 performs a firewall function, the users must trust the analysis of the system. Anchor certificates are used to establish trust between proxy 102 and the users. Anchor certificate 1 through anchor certificate N are provided to user 1 through user N. Anchor certificates 1 through anchor certificate N are connected to the certificate chain provided by proxy 102 and the PKI by referring to a certificate along the chain.

Certificate expiration monitor 104 can be implemented using one or more algorithms that are configured to be loaded onto a processor and to control the processor to determine whether an anchor certificate for a user is nearing expiration. In one example embodiment, certificate expiration monitor 104 can detect a certificate that is closed to expiry, and can automatically generate and send a CSR. A certificate can be detected by monitoring a local data storage, one or more data fields in a data message or other suitable data that can be used to identify the pending expiration of a certificate. Certificate expiration monitor 104 can also provide a point of contact for agents to send their CSRs to, providing further protection for security-critical PKI.

Certificate authority 106 can be implemented using one or more algorithms that are configured to be loaded onto a processor and to control the processor to receive a request for a certificate and to issue the certificate to the requester and other suitable parties. In one example embodiment, the certificates can include a public key infrastructure that uses a public key for certain parts of a transaction and a private key for other parts, where access to the private key is controlled and used to validate the use of the public key. This public key infrastructure supports automated and manual signing of certificate signing requests.

Network 108 and network 110 can be implemented in hardware or a suitable combination of hardware and software, and can be one or more routers, packet switches, multilayer switches, protocol converters, bridge routers, proxy servers, firewalls, network address translators, multiplexers, network interface controllers, wireless network interface controllers, ISDN terminal adapters and other suitable components. In one example embodiment, network 110 can be a private network that is access controlled, and network 108 can be a public network that is exposed to potentially hostile third parties. Likewise, other suitable embodiments can also or alternatively be used, such as virtual private networks, enterprise private networks and so forth.

User 1 and anchor certificate 1 through user N and anchor certificate N can be implemented using one or more algorithms that are configured to be loaded onto a processor and to control the processor to store an anchor certificate. In one example embodiment, an anchor certificate can be a root certificate that is issued by a central authority, which can be administered by proxy 102 or in other suitable manners. Anchor certificates can have associated expiration parameters and can be renewed manually or automatically by proxy 102 or in other suitable manners.

Websites 1 though N can be implemented using one or more algorithms that are configured to be loaded onto a processor and to control the processor to interface with user 1 though user N in conjunction with proxy 102. In one example embodiment, proxy 102 can generate certificates for websites 1 through N when users access them. Websites may also interface with other suitable parties to generate certificates for websites 1 through N, which can be used by user 1 through user N to communicate with the websites.

In operation, system 100 can be used to perform security functions such as providing provide secure access to user 1 through user N to website 1 through website N, where user 1 through user N access website 1 through website N by first accessing proxy 102 over network 110, and by then accessing website 1 through website N from proxy 102 over network 108, using a certificate for the website, issued by the proxy. In this manner, access from user 1 through user N to website 1 through website N can be controlled by proxy 102, to prevent malicious third parties from gaining access to user 1 through user N through website 1 through website N or in other manners. Proxy 102 can use anchor certificate 1 through anchor certificate N to ensure its analysis results are trusted by user 1 through user N, respectively, and can also send a CSR for its own certificate, prior to its expiration. In this manner, user 1 through user N can have uninterrupted access to website 1 through website N without any loss of security. Certificates for the proxy and the websites can be renewed frequently for increased security. This can be a primary use case of the system, but it can support any other security application that uses certificates.

Figure 2:
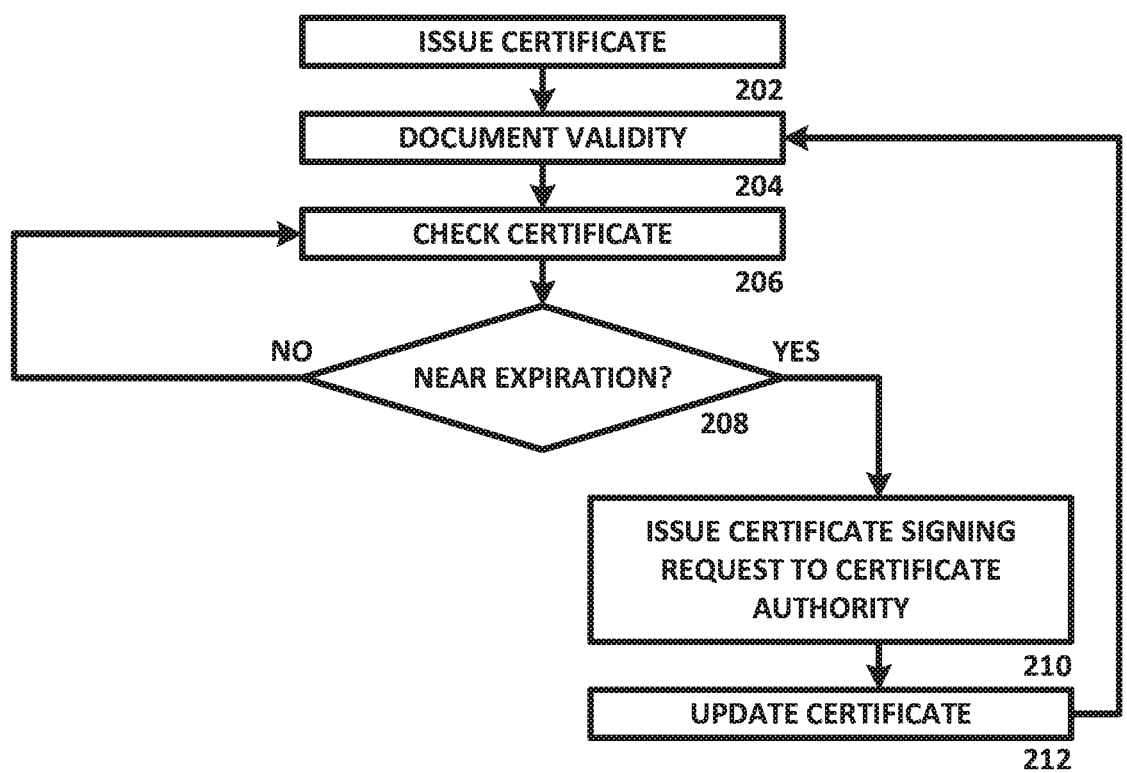
FIG. 2 is a diagram of an algorithm for automated renewal of certificates across a distributed computing system, in accordance with an example embodiment of the present disclosure.

FIG. 2 is a diagram of an algorithm 200 for automated renewal of certificates across distributed computing system, in accordance with an example embodiment of the present disclosure. Algorithm 200 can be implemented in hardware or a suitable combination of hardware and software.

Algorithm 200 begins at 202, where a certificate is issued. In one example embodiment, the certificate can be issued by a central certificate authority, such as when a system is initially configured or in other suitable manners. The certificate can be stored in a predetermined data memory location and used for secure communications, such as for use in encrypting and decrypting data communications or for other suitable processes. The algorithm then proceeds to 204.

At 204, the validity of the certificate is documented. In one example embodiment, a certificate can have a validity that is documented inside the certificate, such as in accordance with RFC 5280 Internet X.509 Public Key Infrastructure Certificate and Certificate Revocation List (CRL) Profile, or in other suitable manners. Likewise, other suitable certificate validity documentation processes or protocols can also or alternatively be used. The algorithm then proceeds to 206.

At 206, a periodic certificate expiration check can be performed, as part of normal operation or in other suitable manners. In one example embodiment, the periodic certificate expiration check can be made by a central certificate authority, in response to data communications involving the certificate or in other suitable manners. The algorithm then proceeds to 208.

At 208, it is determined whether the certificate is near expiration. In one example embodiment, data defining the certificate can be stored in a data register or in other suitable data memory locations, and predetermined data fields can be read by a processor operating under control of a suitable algorithm to determine a certificate expiration status, such as to determine an expected expiration date and time and to further determine whether that expiration date and time is within a predetermined certificate renewal period. If it is determined that the certificate is near expiration, then the algorithm proceeds to 210, otherwise the algorithm returns to 206.

At 210, a certificate signing request is issued to a certificate authority. In one example embodiment, the certificate signing request can be issued by a proxy or other suitable devices or systems. A service can be used that provides a point of contact for agents to send their CSRs to, to provide further protection for security-critical PKI. The PKI itself can also be geographically distributed, with child instances that are also used for auto-renewal. A master PKI can then be used to automatically sign certificates for the child instances. The certificate for the master PKI can be signed automatically or manually, to provide additional security. The algorithm then proceeds to 212.

At 212, the certificate is updated. In one example embodiment, the certificate for the proxy is updated by installing the renewed certificate in the proxy system, or in other suitable manner. The algorithm then returns to 204.

In operation, algorithm 200 provides for automated renewal of certificates across distributed computing system. Although algorithm 200 is shown in flow chart format, it can also or alternatively be implemented using object oriented programming, state diagrams, ladder diagrams or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data processing, comprising:
 a plurality of data processing systems, each associated with a user and having an anchor certificate;
 a proxy system operating on a processor and configured to interact with each of the plurality of data processing systems to provide a firewall function to allow each of the plurality of data processing systems to access a public network, the proxy system further configured to determine whether an expiration associated with the anchor certificate for each data processing system is within a predetermined time of expiration as part of the firewall function, wherein the proxy system is configured to determine a validity of the anchor certificate for each data processing system, to automatically renew the anchor certificate for each data processing system, to replace a previous anchor certificate with the renewed anchor certificate after determining the validity of the anchor certificate and to provide a firewall function; and
 a certificate expiration monitor operating on the processor and configured to generate a certificate signing request in response to the determination that the expiration associated with the anchor certificate for each data processing system is within the predetermined time of expiration.

2. The system of claim 1 wherein each data processing system is configured to receive a new anchor certificate from a firewall system and to replace a previous anchor certificate with the new anchor certificate.

3. The system of claim 1 wherein the proxy system comprises means to receive a new anchor certificate from a firewall system for each data processing system and to replace a previous anchor certificate with the new anchor certificate to perform a firewall function.

4. The system of claim 1 wherein the proxy system is operated by a firewall system and controls access to the plurality of data processing systems, and the proxy system is configured to determine a validity of the anchor certificate for each data processing system in accordance with RFC 5280 Internet X.509 Public Key Infrastructure Certificate prior to allowing data communications with each data processing system.

5. The system of claim 1 wherein the proxy system is configured to determine a validity of the anchor certificate for each data processing system in accordance with RFC 5280 Internet X.509 Public Key Infrastructure Certificate and a Certificate Revocation List (CRL) Profile.

6. A method for data processing, comprising:
 receiving an anchor certificate from each of a plurality of data processing systems as part of a firewall function, wherein each data processing system is associated with a user, determining a validity of the anchor certificate for each data processing system and automatically renewing the anchor certificate for each data processing system;
 determining with a proxy system operating on a processor whether an expiration associated with the anchor certificate for each data processing system is within a predetermined time of expiration prior to performing the firewall function; and
 generating a certificate signing request with a certificate expiration monitor operating on the processor in response to the determination that the expiration associated with the anchor certificate for each data processing system is within the predetermined time of expiration prior to allowing each data processing system to access a public network, to replace a previous anchor certificate with the renewed anchor certificate after determining the validity of the anchor certificate.

7. The method of claim 6 further comprising:
 preventing access by each data processing system to an external network if the expiration associated with the anchor certificate for each data processing system is within the predetermined time of expiration; and
 allowing access by each data processing system to the external network after replacing the previous anchor certificate with the renewed anchor certificate.

8. The method of claim 6 further comprising:
 preventing access to one of the data processing systems if the anchor certificate for that data processing system is invalid.

9. The method of claim 6 further comprising determining a validity of the anchor certificate for each data processing system using the proxy system in accordance with RFC 5280 Internet X.509 Public Key Infrastructure Certificate and preventing access to one of the data processing systems if the anchor certificate for that data processing system is invalid until a new anchor certificate is received.

10. The method of claim 6 further comprising determining a validity of the anchor certificate for each data processing system wherein the proxy system in accordance with RFC 5280 Internet X.509 Public Key Infrastructure Certificate and a Certificate Revocation List (CRL) Profile.

11. A data memory device storing algorithmic instructions that cause a processor to perform the steps of:
 receiving an anchor certificate from each of a plurality of data processing systems prior to allowing access to a public network for each of the plurality of data processing systems, wherein each data processing system is associated with a user, determining a validity of the anchor certificate for each data processing system and automatically renewing the anchor certificate for each data processing system;
 determining with a proxy system operating on a processor whether an expiration associated with the anchor certificate for each data processing system is within a predetermined time of expiration prior to allowing access to the public network for each of the plurality of data processing systems; and
 generating a certificate signing request with a certificate expiration monitor operating on the processor in response to the determination that the expiration associated with the anchor certificate for each data processing system is within the predetermined time of expiration prior to allowing access to the public network for each of the plurality of data processing systems, to replace a previous anchor certificate with the renewed anchor certificate after determining the validity of the anchor certificate.

12. The data memory device of claim 11 wherein the algorithmic instructions further comprise determining a validity of the anchor certificate for each data processing system using the proxy system as part of firewall processing for each data processing system.

13. The data memory device of claim 11 wherein the algorithmic instructions further comprise determining a validity of the anchor certificate for each data processing system using the proxy system in accordance with RFC 5280 Internet X.509 Public Key Infrastructure Certificate.

14. The data memory device of claim 11 wherein the algorithmic instructions further comprise determining a validity of the anchor certificate for each data processing system wherein the proxy system in accordance with RFC 5280 Internet X.509 Public Key Infrastructure Certificate and a Certificate Revocation List (CRL) Profile.

* * * * *